(12) United States Patent
Shimizu et al.

(10) Patent No.: US 9,504,229 B2
(45) Date of Patent: Nov. 29, 2016

(54) FLOOR MATERIAL FOR PET ANIMAL URINATION

(75) Inventors: Shingo Shimizu, Tokyo (JP); Takayuki Matsuo, Tokyo (JP); Shotaro Mochizuki, Fujieda (JP)

(73) Assignee: Unicharm Corporation, Ehime (JP)

( * ) Notice: Subject to any disclaimer, the term of this patent is extended or adjusted under 35 U.S.C. 154(b) by 77 days.

(21) Appl. No.: 12/308,515

(22) PCT Filed: Jul. 3, 2007

(86) PCT No.: PCT/JP2007/063292
§ 371 (c)(1),
(2), (4) Date: Dec. 17, 2008

(87) PCT Pub. No.: WO2008/007577
PCT Pub. Date: Jan. 17, 2008

(65) Prior Publication Data
US 2009/0308322 A1    Dec. 17, 2009

(30) Foreign Application Priority Data
Jul. 10, 2006  (JP) ................................ 2006-189642

(51) Int. Cl.
*A01K 1/015*    (2006.01)

(52) U.S. Cl.
CPC ........... *A01K 1/0154* (2013.01); *A01K 1/0155* (2013.01)

(58) Field of Classification Search
CPC ............ A01K 1/0107; A01K 1/0152; A01K 1/0154; A01K 1/0155; A01K 1/0157
USPC ........................................................ 119/171
See application file for complete search history.

(56) References Cited

U.S. PATENT DOCUMENTS

| | | | | | |
|---|---|---|---|---|---|
| 4,774,907 | A | * | 10/1988 | Yananton | A01K 1/0152 119/169 |
| 5,830,765 | A | * | 11/1998 | Santioemmo et al. | 436/66 |

(Continued)

FOREIGN PATENT DOCUMENTS

| | | |
|---|---|---|
| JP | 63-102619 | 5/1988 |
| JP | 11-32608 | 2/1999 |

(Continued)

OTHER PUBLICATIONS

International Search Report issued Oct. 9, 2007 in the International (PCT) Application of which the present application is the U.S. National Stage.

Primary Examiner — Monica Williams
(74) Attorney, Agent, or Firm — Brinks Gilson & Lione

(57) ABSTRACT

The present invention provides a floor material for pet animal urination, which has an effect to allow urine to pass through by suppressing speed and amount of urine absorption, as well as an effect of low water absorbency allowing to gradually absorb residual urine sweating the grain surface, which also has good shape retentivity so as not to be collapsed even if urine is absorbed, and thus which is highly suitable as a floor material for pet animal urination.

There is provided a floor material for pet animal urination, wherein a surface of each of water-absorbing grains (1') is coated by a slow water-semipermeable coating (6); and because of the slow water-semipermeable coating (6), urine is prompted to pass between the water-absorbing grains, and residual urine (8) sweating the surface of the water-semipermeable coating (6) is gradually absorbed into the water-absorbing grains (1') through the water-semipermeable coating (6).

2 Claims, 2 Drawing Sheets

(56) References Cited

U.S. PATENT DOCUMENTS

| | | | |
|---|---|---|---|
| 5,975,018 A * | 11/1999 | Otoguro | 119/171 |
| 6,619,233 B1 | 9/2003 | Mochizuki | |
| 7,387,085 B2 * | 6/2008 | Ikegami | A01K 1/0152 119/171 |
| 7,467,600 B2 * | 12/2008 | Ikegami | A01K 1/0152 119/171 |
| 2005/0000462 A1 * | 1/2005 | Matsuo | A01K 1/0114 119/171 |
| 2005/0175577 A1 * | 8/2005 | Jenkins et al. | 424/76.1 |
| 2006/0112893 A1 * | 6/2006 | Ikegami | A01K 1/0152 119/171 |
| 2006/0112894 A1 * | 6/2006 | Ikegami et al. | 119/171 |

FOREIGN PATENT DOCUMENTS

| | | |
|---|---|---|
| JP | 11-114402 | 4/1999 |
| JP | 2003-274780 | 9/2003 |

* cited by examiner

FLOOR MATERIAL FOR PET ANIMAL URINATION

TECHNICAL FIELD

The present invention relates to a floor material for pet animal urination used to provide a place for excretion for a pet animal.

BACKGROUND ART

As disclosed in Patent Documents 1 and 2, for example, there is a known litter system for a pet animal having two-tired structure of a floor material for urination and a urine-absorptive material so as to prompt excretion on the floor material for urination, and to absorb urine passed through the floor material for urination on the absorptive material.

Pet animals are fond of excreting on a sandy article in habit. Therefore, in Patent Documents 1 and 2, granular materials allowing urine to pass through rather than absorbing it is spread as the floor material for urination. The floor material for urination is arranged in the upper tier to prompt a pet animal to access the litter and to excrete, and the urine is absorbed by absorptive material in the lower tier.

In Patent Document 1, plant-derived crushed pieces and synthetic resin powder are mixed under stirring to mold into grains. The synthetic resin powder is molten by heat spontaneously generated during molding with a molding machine so that the plant-derived crushed pieces are bonded together due to the melt so as to attain urine absorption inhibitory effect and shape retentivity ensuring the crushed pieces not to be collapsed even if urine is absorbed.

In Patent Document 2, there is described a method for allowing urine passing through the floor material for urination without being absorbed by using mineral sand such as river sand for the floor material for urination, and applying a water repellent coating such as silicon or wax to the sand.

Patent Document 1: Japanese Patent No. 3519353
Patent Document 2: Japanese Patent Application laid-Open No. 7-67489

DISCLOSURE OF THE INVENTION

Problems to be Solved by the Invention

In the Patent Document, the floor material for urination is molded into grains by mixing plant-derived crushed pieces and synthetic resin powder under stirring, and the synthetic resin powder is molten by heat generated during formation of grains thereby enhancing the bonding. However, even if the synthetic resin powder can be molten by heat generated during molding and thereby the plant-derived crushed pieces can be bonded together, it is difficult to bond the whole amount of the plant-derived crushed pieces through poor mixing of the synthetic resin powder. Therefore, practically, urine penetrates to the cores of the grains, which causes a problem that the repeating penetrations on every time of urination can collapse each of the grains as a whole to impair the function of the floor material for urination.

By rich mixing of the synthetic resin powder, collapse can be prevented, however, the low water absorbency (urine absorption inhibitory effect) expected in Patent Document 1 is impaired, and thus the intended object cannot be accomplished.

On the other hand, the floor material for urination described in the Patent Document 2, which is sand particles coated by a water repellent obtained by mixing mineral sand with a water repellent under stirring and then drying, will not cause the problem of collapse as may be caused by that of the Patent Document 1. However, the surfaces of the sand particles are coated by a water repellent and thus hardly absorb water. Therefore, many fine droplets of residual urine are formed on the surfaces of the sand particles coated by the water repellent due to surface tension. The droplets of residual urine are exposed to the outside air while blocked by the water repellent, and progress of rot causes a notable problem of unpleasant odors.

Means for Solving the Problem

In order to effectively solve the above problems, the present invention provides a floor material for urination, which is suitable for a floor material for urination prompting excretion of pet animals. More specifically, the floor material for urination is configured to be a floor material for urination used in a pet animal litter system having a floor material for urination, which is of water-absorbing grains, for prompting a pet animal to excrete arranged in the upper tier and an absorptive material in the lower tier for absorbing urine passed through the floor material, wherein a surface of each of water-absorbing grains is coated by a slow water-semipermeable coating; and because of the slow water-semipermeable coating, urine is prompted to pass between the water-absorbing grains, and residual urine sweating the surface of the water-semipermeable coating is gradually absorbed into the water-absorbing grain through the water-semipermeable coating.

Each of the water-absorbing grains is configured to have substantially spherical form, or form of flattened spherical grain by compression molding. In this case, the grains have flat outside surfaces.

As a preferable example, the slow water-semipermeable coating contains a sizing agent for adjusting water absorbency.

Effect of the Invention

The floor material for pet animal urination according to the above-described embodiment of the present invention has an effect to allow urine to pass through by suppressing speed and amount of urine absorption, as well as an effect of low water absorbency allowing to gradually absorb residual urine sweating the grain surfaces after urination. The floor material also has good shape retentivity so as not to be collapsed even if urine is absorbed. Therefore, the floor material is highly suitable as a floor material for pet animal urination.

Further, the residual urine can be absorbed into the grains through the slow water-semipermeable coating, and concealed by the water-semipermeable coating. As a result, the progress of rot of residual urine is inhibited, and thus the generation of unpleasant odors is effectively prevented.

Further, the water-absorbing grains may be compression molded into flat grains thereby improving their settling properties and preventing flying apart during spread of the floor material.

Further, a sizing agent may be contained in the slow water-semipermeable coating thereby improving the water resistance and water-semipermeability of the coating. The improvement of the water resistance enhances the shape retentivity of the coating.

Figure 1:
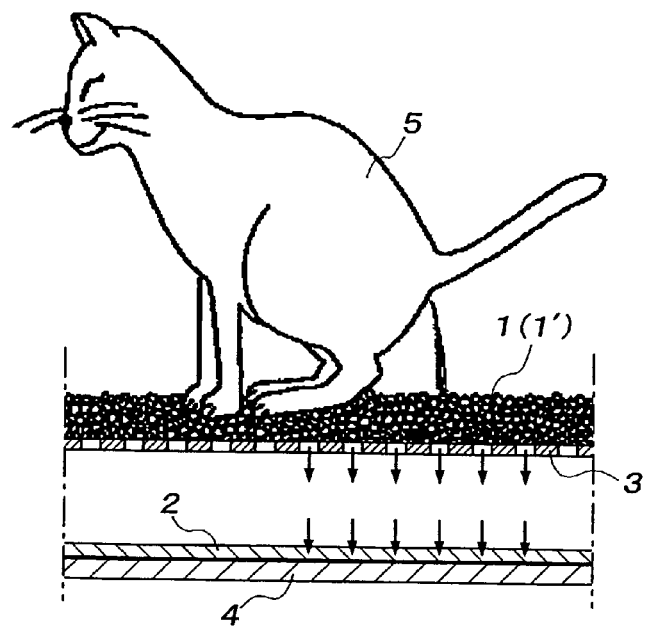
FIG. 1 is a cross sectional view showing an example of use of the floor material for pet animal urination according to the present invention.

REFERENCE NUMERALS 1 floor material for urination
1' water-absorbing grains
2 absorptive material
3 porous plate
4 urine-receiving tray
5 pet animal
6 water-semipermeable coating
7 flat surface
8 residual urine
9 plant fibers
10 inorganic filling material

BEST MODE FOR CARRYING OUT THE INVENTION

The best mode for carrying out the invention is described with reference to FIGS. 1 to 3. As described above, there is a known pet animal litter system shown in FIG. 1 having a floor material for urination 1, which is of grains 1', for prompting a pet animal to excrete arranged in the upper tier and an absorptive material 2 in the lower tier for absorbing urine passed through the floor material 1.

In the litter system, a porous plate 3 such as a draining board is arranged in the upper tier, a urine-receiving tray 4 is arranged in the lower tier, the floor material for urination 1, which is of the grains 1', is arranged on the porous plate 3, and the absorptive material 2 such as a water-absorbing sheet is arranged on a urine-receiving tray 4.

The grains 1' do not have objective function to absorb urine when excreted, but, have an object to provide a place of excretion for prompting a pet animal 5 to excrete. The pet animal 5 excretes on the grains 1' (floor material for urination 1), the excreted urine passes through the grains 1', drops on the absorptive material 2 through the porous plate 3 and is absorbed into the absorptive material 2. The used absorptive material 2 is replaced in a short period, such as about one week for example, while the grains 1' are replaced after repeated use for about one month for example.

The present invention provides the grains 1' suitable for the object of the floor material for urination 1, and the grains 1' are mostly water-absorbing grains 1' made mainly out of plant fibers 9.

Plant-derived pulp such as wood pulp, wood powder, or fibers made by pulverizing waste paper may be used as the plant fibers 9.

The followings are examples of compound and compounding ratio (% by weight) of the grains 1'.

<First Compound Example and Compounding Ratio>
Pulp 100%
<Second Compound Example and Compounding Ratio>
Pulp 50 to 99%
Inorganic filling material 1 to 50%
<Third Compound Example and Compounding Ratio>
Pulp 45 to 98%
Inorganic filling material 1 to 50%
Antibacterial agent 1 to 5%

Figure 2A:
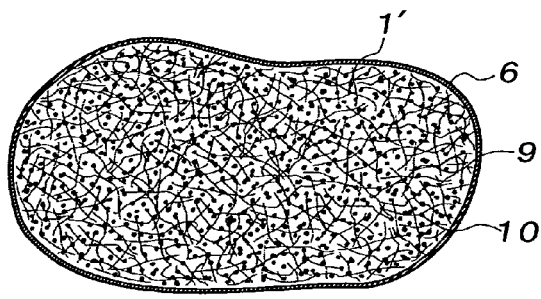
FIG. 2A is an enlarged cross sectional view of water-absorbing grains formed to be the floor material for pet animal urination according to the present invention, the grains being coated by a slow water-semipermeable coating.
Figure 2B:
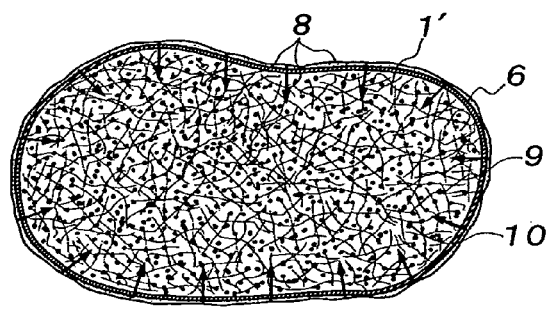
FIG. 2B is an enlarged cross sectional view illustrating absorbing state of residual urine by the grains.

Each of the above compounds made mainly out of aggregates of the plant fibers 9 is processed with a granulating machine with or without addition of water so as to form the water-absorbing grains 1' as shown in FIG. 2.

The inorganic filling material 10 in each of the second and third compound is used to increase the weight of the grains 1' of the plant fibers 9, and to adjust the void ratio in the plant fibers 9 thereby adjusting to reduce the amount of water absorption. The inorganic filling material 10 is made out of powder such as talc, clay, or calcium carbonate.

The antibacterial agent in the third compound prevents rot of residual urine, which passes through the slow water-semipermeable coating 6 and is absorbed into the water-absorbing grains 1' so as to prevent unpleasant odors being generated.

The water-absorbing grains 1' in each of the above-described examples are formed by rotating the compound of any one of the first to third compounds on a rotary table or in a rotary drum to promote their growth, and thus the water-absorbing grains 1' are formed without compression.

Alternatively, the compound of each of the compound examples is kneaded with addition of water, and processed with a compression molding machine to perform compression molding on water-absorbing grains 1' of a certain shape.

Alternatively, the compound of each of the compound examples is processed with a tableting machine or extruding machine without addition of water to perform compression molding on water-absorbing grains 1'.

The water-absorbing grains 1' are processed with any of the above-described granulating machines to mold grains having a size of about 3 mm to 15 mm.

Then, the surfaces of the water-absorbing grains 1' are coated by the slow water-semipermeable coating 6 which suppresses the water absorbency of the grains 1'.

The slow water-semipermeable coating 6 is a coating or layer, which transmits water at a lower rate than a permeable coating, and limits the amount of permeable water.

To specifically explain, the urination period of the pet animal 5, such as a cat, is about 10 to 25 seconds. The term "slow" herein means that the coating has a time-lag for absorbing the urine, more specifically, it is substantially impermeable to urine during urination, and gradually absorbs residual urine 8 sweating the surface of the water-semipermeable coating 6 after urination, while the term "water-semipermeable" herein means that the coating is substantially impermeable to the whole amount of urine during urination, and is permeable to the residual urine 8.

Accordingly, the slow water-semipermeable coating 6 is different from a processing material for a purpose of absorbing the almost whole amount of urine, and is a low-absorbent suppressive material for suppressing water absorbency that prompts urine to pass through the grains 1' applied with the water-semipermeable coating 6 during urination, and absorbs the residual urine 8 sweating the surface of the water-semipermeable coating 6 after urination (excretion).

The water-semipermeable coating 6 is made out of water-soluble PVA, water-soluble EVA, or polyurethane, for example. These coating materials are suitable since they impart limited water permeability and time-lag to the slow water-semipermeable coating 6. PVA is particularly preferable because it is highly water-dispersible and available at a low cost.

The followings are examples of compound and compounding ratio (% by weight) of the water-semipermeable coating 6, accompanied by the coefficient of water permeability of each example.

<First Compound Example and Compounding Ratio>
PVA 100%
Coefficient of water permeability of first compound: 10 to 30%
<Second Compound Example and Compounding Ratio>
PVA 10 to 99%
Sizing agent 1 to 90%
Coefficient of water permeability of second compound: 1 to 10%
<Third Compound Example and Compounding Ratio>
PVA 95 to 99%
Antibacterial agent 1 to 5%
Coefficient of water permeability of third compound: 10 to 20%
<Fourth Compound Example and Compounding Ratio>
PVA 5 to 98%
Sizing agent 1 to 90%
Antibacterial agent 1 to 5%
Coefficient of water permeability of fourth compound: 5 to 10%

The coefficient of water permeability was obtained by: preparing a cylindrical container having a diameter of 50 mm and a depth of 50 mm with a netted bottom; filling the grains 1' applied with the water-semipermeable coating 6 in the container up to a height of 20 mm; dropping 20 ml of 2% saline solution at 35° C. contained in a syringe (syringe SS-50ESZ, manufactured by Terumo Corporation) on the grains 1'; measuring the amount of saline solution passed through the cylindrical container containing the grains 1'; and subtracting the measured amount from 20 ml then dividing the result by 20 and multiplying by 100.

The water-semipermeable coating 6 having a coefficient of water permeability of 3 to 15% was effective in impermeability to urine and permeability to residual urine, shape retentivity, and deodorizing properties.

The antibacterial agent may be organic, inorganic metal, photocatalytic, or natural, however, an organic antibacterial surfactant is effective. The antibacterial surfactant imparts antibacterial effect to the water-semipermeable coating 6, and is capable of adjusting the water permeability performance (coefficient of water permeability) of the water-semipermeable coating 6.

The antibacterial agent in the third compound example may be contained only in the water-absorbing grains 1' with no antibacterial agent in the water-semipermeable coating 6, or contained in both of the water-absorbing grains 1' and the water-semipermeable coating 6.

Further, in order to achieve the effect of the surfactant, a simple surfactant may be contained in the water-semipermeable coating 6. More specifically, the water-semipermeable coating 6 in any of the first to fourth compound examples contains 1 to 5% of a surfactant. In this case, the compounding ratios of the compounds of the respective compound examples vary depending on the compounding ratio of the surfactant.

The water-semipermeable coating 6 is formed by spraying a material for forming the water-semipermeable coating 6 in any of the compound examples to the surfaces of the water-absorbing grains 1', for example. The thickness of the water-semipermeable coating 6 is defined depending on the amount of spray and the concentration of the material for forming the water-semipermeable coating.

The slow water-semipermeable coating 6 according to any of the above compound examples can suppress urine absorption into the water-absorbing grains 1' during excretion so as to prompt urine to pass during urination, and can gradually absorb the residual urine 8 sweating the surface of the water-semipermeable coating 6 into the water-absorbing grains 1' through the water-semipermeable coating 6.

Figure 3A:
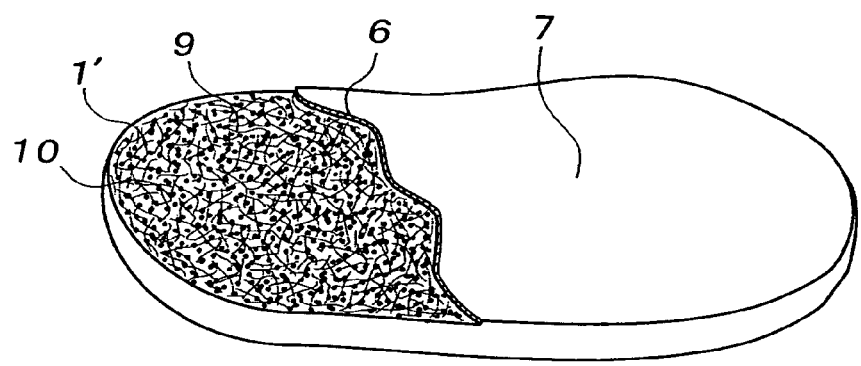
FIG. 3A is a perspective view showing the water-absorbing grains applied with the water-semipermeable coating and formed into a flat shape.
Figure 3B:
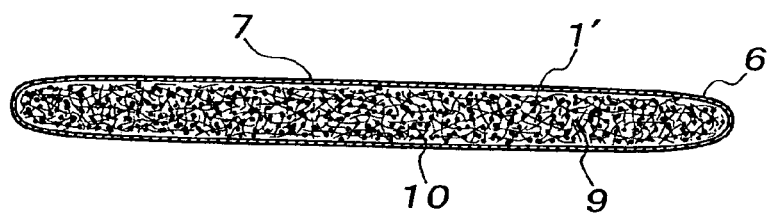
FIG. 3B is a cross sectional view showing the same.

Each of the water-absorbing grains 1' is made to have a cross-sectional shape of substantially spherical form as shown in FIG. 2, or to have a flattened shape of a spherical grain by compression molding as shown in FIG. 3. More specifically, the grains are formed with the above-described granulating machine, and then compressed into flat form by passing between rollers, for example.

The water-absorbing grains 1' in a flat form have substantially flat large surfaces 7 on their top and bottom, whereby the water-absorbing grains 1' are stably spread over the porous plate 3.

As the water-semipermeable coating 6, PVA alone, for example, may be used as shown in the first compound example, or PVA or the like and an antibacterial agent may be used as shown the third compound example. Alternatively, as shown in the second to fourth compound examples, a sizing agent may be added during formation of the coating to be contained in the slow water-semipermeable coating. This does not limit use of the PVA and EVA in combination.

The sizing agent is added during paper-making in order to impart water resistance to a paper. By containing the sizing agent in the slow water-semipermeable coating 6, water resistance of the water-semipermeable coating 6 coating the surfaces of the water-absorbing grains 1' can be improved, and the water resistance enhances the shape retentivity, or coating strength ensuring the grains not to be collapsed by repeating absorption of the residual urine 8.

In other words, by compounding the sizing agent in the slow water-semipermeable coating 6, the water resistance can be improved, then the water-semipermeability can be improved, and then the improvement of water resistance enhances the shape retentivity of the coating.

The invention claimed is:
1. A floor material for pet animal urination used in a pet animal litter system having a urine-absorbing material for absorbing urination, which floor material comprises urine-absorbing granular particles formed by aggregating a urine-absorbing material, for prompting a pet animal to excrete arranged in an upper tier and an absorptive material in a lower tier for absorbing urine passed through the floor material, wherein after the particles are formed by aggregating the urine-absorbing material a water-semipermeable coating is applied to coat the entire surface of each of the granular particles which water-semipermeable coating slows urination absorbing speed as compared to urination absorbing speed of non-coated granular particles of the urine-absorbing granular particles; the water-semipermeable coating contains a sizing agent;

wherein the water-semipermeable coating containing the sizing agent promotes the passage of urine between the urine-absorbing granular particles, and allows residual urine wetting the surface of the water-semipermeable coating to be gradually absorbed into the urine-absorbing granular particles through the water-semipermeable coating, and wherein the pet litter system includes a porous plate that supports the floor material so that the floor material is above and spaced apart from the urine-absorbing material with an open space between the floor material and the urine-absorbing material, the porous plate having a plurality of openings therein through which urine passes and drops onto the urine-absorbing material.

2. The floor material for pet animal urination, according to claim 1, wherein the urine-absorbing granular particles have been subjected to a compression molding process that flattens the urine-absorbing granular particles.

* * * * *